July 20, 1954

G. P. ADAMS ET AL 2,684,148

APPARATUS FOR ADVANCING MATERIAL

Filed Dec. 14, 1951

INVENTORS
G. P. ADAMS
S. M. MARTIN
BY:

ATTORNEY

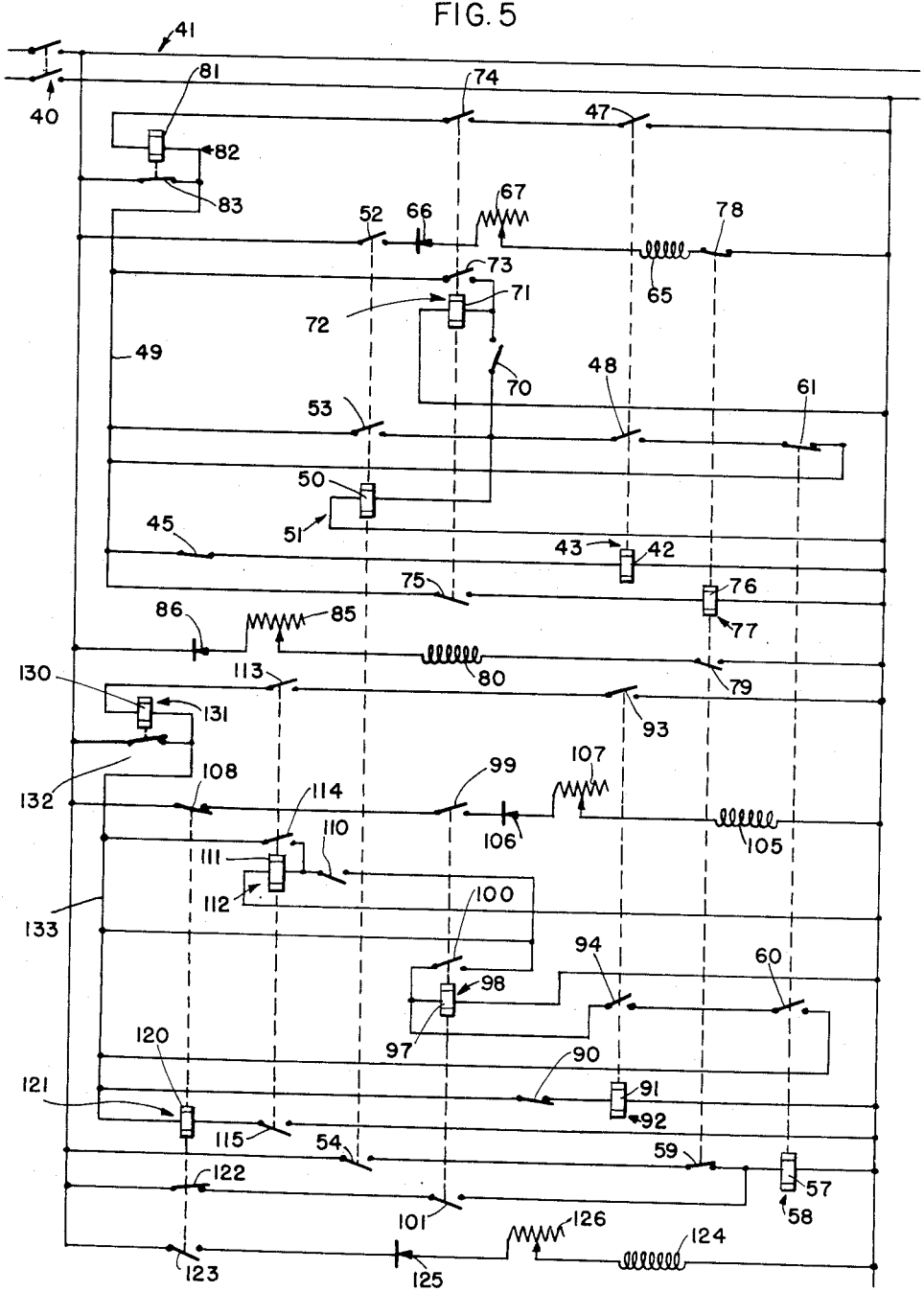

Patented July 20, 1954

2,684,148

UNITED STATES PATENT OFFICE 2,684,148

APPARATUS FOR ADVANCING MATERIAL

George P. Adams, Baltimore, and Samuel M. Martin, Lutherville, Md., assignors to Western Electric Company, Incorporated, New York, N. Y., a corporation of New York Application December 14, 1951, Serial No. 261,711

6 Claims. (Cl. 198—39)

This invention relates to apparatus for advancing material, and has for an object thereof the provision of new and improved apparatus for advancing material.

Another object of the invention is to provide a new and improved apparatus for conveying plastic materials.

A further object of the invention is to provide apparatus for conveying powdered or granulated plastic materials from a plasticizing mixer, dividing the material in equal portions and conveying the divided material to pigmenting mixers.

In accordance with an apparatus illustrating certain features of the invention, there may be provided a main guideway along which granular material may be passed from one end toward the other end. The guideway has a slot positioned in the bottom thereof intermediate the ends thereof over a branch guideway. The material drops through the slot as long as the material in the branch guideway is conveyed away from the slot. Means may be provided for preventing movement of the material away from the slot so that the material piles up and closes the slot, after which the material is conveyed along the main guideway. If desired, the main guideway may be provided with a second slot and a second branch guideway positioned below the second slot. The operation of the two branch guideways may be so controlled that the material delivered to each is equal to that delivered to the other.

A complete understanding of the invention may be obtained from the following detailed description of an apparatus forming a specific embodiment thereof, when read in conjunction with the appended drawings, in which Fig. 1 is a fragmentary, perspective view of an apparatus forming one embodiment of the invention;

Fig. 5 is a diagrammatic view of a control circuit of the apparatus shown in Fig. 1.

Figure 1:
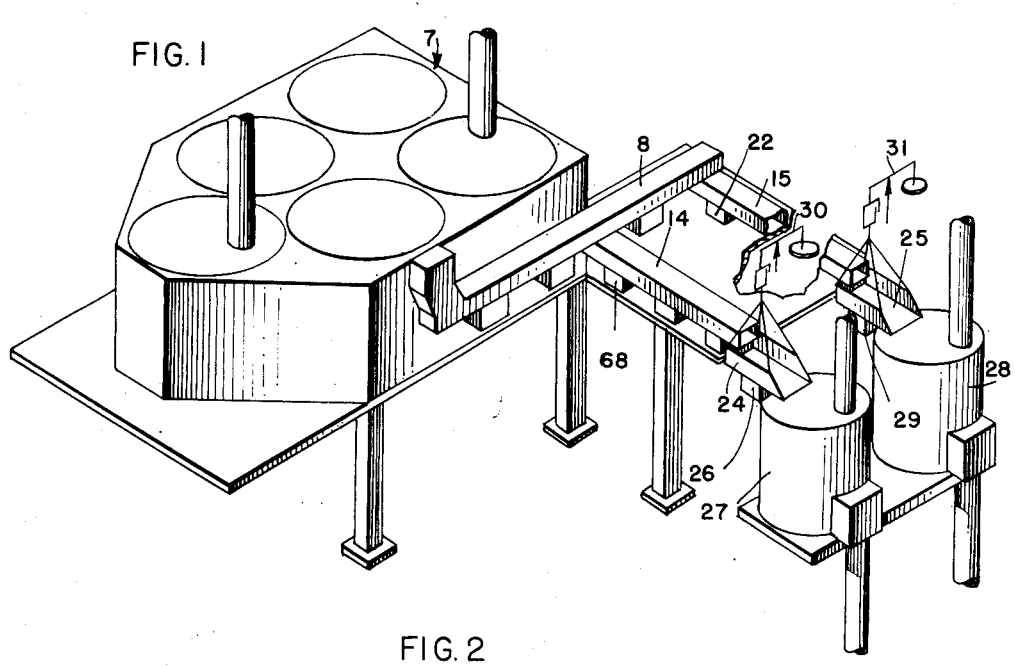
Figure 2:
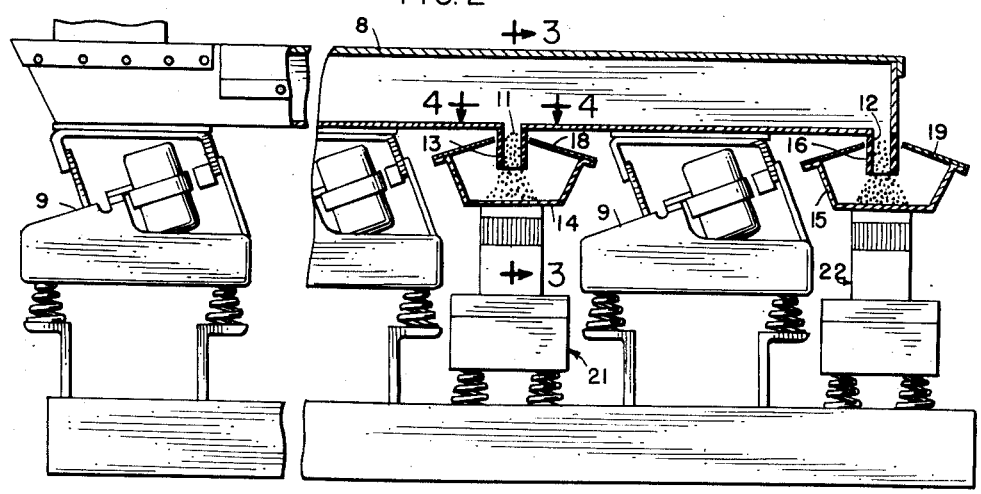
Fig. 2 is an enlarged elevation of a portion of the apparatus shown in Fig. 1 with portions thereof broken away.
Figure 3:
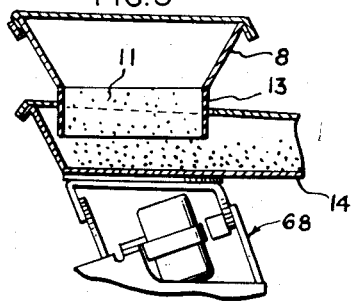
Fig. 3 is a vertical section taken along the line 3—3 of Fig. 2.
Figure 4:
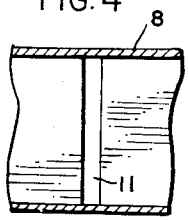
Fig. 4 is a horizontal section taken along line 4—4 of Fig. 2.

Referring now in detail to the drawings, there is shown in Fig. 1 a mixer 7, which continuously mixes together the ingredients of a compound, such as, for example, a plastic compound in which the essential plastic ingredient is polyvinyl chloride or a copolymer of vinyl acetate and vinyl chloride, and delivers the material continuously to the lefthand end of a main channel-like conveyor trough 8, as viewed in Fig. 1. The trough 8 may be provided with a cover, if desired. The trough 8 is supported by vibrating devices 9—9 of a well-known type, which, when operated, vibrate the trough 8 to advance the plastic material continuously to the right, as viewed in Fig. 2, toward slots 11 and 12 extending completely across the bottom of the trough 8. All the material advanced along the trough 8 is dropped through the slot 11 and a spout 13 aligned with the slot 11 to a branch conveyor trough 14 until the material piles up in the trough 14 to the top of the slot 11, after which the material is advanced over and past the slot 11 to the slot 12 and discharges through the slot 12 into a branch conveyor trough 15 through a spout 16 positioned directly below the slot 12. The spouts are flexible, being composed of a resilient Neoprene or rubber compound, and project through enlarged openings 18 and 19 in the troughs 14 and 15 without contact with these troughs. Thus, the spout 13 damps vibrations from the trough 8 to the material in the trough 14, and leakage from the trough 8 to the trough 14 is prevented.

Vibrating units 21 and 22 vibrate the branch troughs 14 and 15 to advance the plastic material from under the slots 11 and 12 to the discharge ends of the branch troughs 14 and 15, which discharge into weigh pans 24 and 25, respectively. The weigh pan 24 is operable by a vibrating unit 26 to discharge material weighed therein into a mixer 27, in which pigment may be interspersed into the plasticized plastic material. The weigh pan 25 is designed to be emptied into a mixer 28 for pigmenting by a vibrating unit 29. The weigh pans 24 and 25 are suspended by balance arms 30 and 31 of a well-known type. The balances are provided with tare switches of a well-known type, which are actuated when the pans are emptied, and other switches which are actuated when the pans have therein amounts of material which they are designed to weigh.

A control circuit for the apparatus shown in Figs. 1 to 4, inclusive, is shown in Fig. 5, and includes a manually operable switch 40 and a power line 41. When the switch 40 is closed, assuming that the pan 25 has just been filled with the proper amount of plastic material and the weigh pan 24 is empty, a tare switch 45, which is actuated by the balance arm 30 when the weigh pan 24 is empty, is closed, and a relay winding 42 of a relay 43 is energized to close contacts 47 and 48. Closing of the contact 46 completes a circuit from a conductor 49 to one side of the power line 41 through a contact 61 and a winding 50 of a relay 51 to close contacts 52, 53 and 54. Closing of the contact 54 closes a relay winding 57 of a ratchet relay 58 to be energized through the contact 54 and the contact 59. The relay 58 is of a ratchet type of well-known construction, and upon deenergization of the winding 57 after it has been energized, serves to reverse the position of contacts 60 and 61. Thus, whenever, the relay winding 57 is next deenergized, the contact 61 is opened and contact 60 is closed.

The closing of the contact 52 of the relay 51 completes a circuit across the power line to a winding 65 through a rectifier 66 and a rheostat 67, and an alternating current supplied by the power line 41 is changed to pulsating direct current by the rectifier 66. This pulsating direct current energizes and deenergizes the winding 65, which is the operating element of a vibrating unit 68 serving to vibrate the branch trough 14 to feed material from the slot 11 to the pan 24 at a rate faster than at which the trough 8 feeds the material to the slot 11. Thus, the material accumulated in the spout 13 under the slot 11 drops therefrom and all the material coming along the trough 8 is dropped through the slot 11. As the pan 24 receives the material, the tare switch 45 is opened thereby to drop out the relay 43.

When the pan 24 receives sufficient plastic material to swing the balance arm 30, a switch 70 is closed thereby to energize a winding 71 of a relay 72. This closes contacts 73, 74 and 75. Closing of the contact 75 completes a circuit through a relay winding 76 of a relay 77 to open the contact 59 and a contact 78 in series with the vibrating unit winding 65 to stop advancement of the plastic material along the trough 14 to the weigh pan 24. The opening of the contact 59 breaks the circuit to the winding 57 of the ratchet relay 58. The deenergization of the winding 57 causes the contact 60 to close and the contact 61 to open. Opening of the contact 61 prevents energization of the drive of the branch trough 14 until the relay winding 57 has been again energized and deenergized to again reverse the condition of the contacts 60 and 61. The relay 77 also closes a contact 79 thereof, which closes a circuit across the power line to a winding 80 of the vibrating unit 26 attached to the weigh pan 24 for discharging the material from the pan 24. The winding 80 is in series with a control rheostat 85 and a rectifier 86, which causes it to be energized with pulsating direct current.

A winding 81 of a time delay relay 82 having a normally closed contact 83 is in series with the contacts 47, 74 and 83 across the power line 41. The contact 83 also is interposed between one of the conductors of the power line and the contacts 73, 53, 61, the tare switch 45 and the contact 75 so that, whenever the contacts 47 and 74 are closed simultaneously to energize the winding 81 momentarily and open the contact 83, the portion of the circuit in series with the contact 83 is reset.

When the contact 60 is closed and the weigh pan 25 is empty, a tare switch 90, operable by the weigh pan 25 when completely empty, is closed to complete the circuit across the power line to a winding 91 of a relay 92. This closes contacts 93 and 94. Closure of the contact 94 completes the circuit across the power line through the contact 60 and a contact 94 and a relay winding 97 of a relay 98. The relay 98 closes contacts 99, 100 and 101 thereof. Closing of the contact 99 completes a circuit across the power line to a winding 105 of the vibrating unit 22 operating the branch trough 15, and the branch trough 15 is vibrated to feed plastic material from the slot 12 to the weigh pan 25. A rectifier 106 and a rheostat 107 are in series with the winding 105, and a normally closed contact 108 also is in series therewith.

As soon as the first minute quantity of the plastic material is dropped from the trough 15 into the weigh pan 25, the switch 90 is opened to drop out the relay 92. This opens the contact 94, but the holding contact 100 of the relay 98 maintains the winding 97 in energized condition. As soon as the weigh pan 25 receives the exact quantity desired, the balance arm 31 closes a switch 110 to cause energization of a relay winding 111 of a relay 112, which closes contacts 113, 114 and 115, the contact 114 being a holding contact. Closing of the contact 115 completes the circuit across the power line to a winding 120 of a relay 121, and the relay 121 opens the contact 108 thereof to stop the vibrating unit 22 of the trough 15, opens the contact 122, and closes the contact 123. Closing of the contact 123 completes the circuit across the power line to a winding 124 of the vibrating unit 29 associated with the weigh pan 25 to discharging plastic material from the weigh pan 25 to the mixer 28. A rectifier 125 and a rheostat 126 are connected in series with the winding 124, and the rectifier provides pulsating direct current for energizing and deenergizing the winding 124. A winding 130 of a time delay relay 131 is connected in series with the contacts 93 and 113 and a contact 132. After the winding 130 has been energized for a predetermined period of time, it opens momentarily the contact 132 thereof to reset the portion of the control circuit connected to a conductor 133 connected in series with the contact 132.

*Operation*

Assuming that the pan 25 has just been filled, the ratchet relay 58 has been actuated to close the contact 61 and open the contact 60, and the pan 24 is empty so that the switch 45 is closed, and the relay 43 is actuated to close contacts 47 and 48. Closing the contact 48 actuates the relay 51 to close the contact 52 to the vibrator winding 65 and close the holding contact 53 to the winding 50 of the relay 51. The periodic actuation of the winding 65 feeds the plastic material along the branch trough 14 to the weigh pan 24. The tare switch 45 then is opened by the material on the pan 24 to drop out the relay 43, and the feeding of the material to the pan 24 is continued until the weigh pan 24 receives an amount sufficient to swing the balance arm 30 (Fig. 1).

The switch 70 is closed by this swinging of the arm 30, and actuates the relay 72 to close contacts 73, 74 and 75. Closing of contact 75 energizes relay winding 76 to open contacts 59 and 78 and close contact 79. Opening of the contact 78 deenergizes the feeder winding 65 to stop movement of the plastic material along the branch trough 14, and opening of the contact 59 deenergizes the ratchet relay 58, which opens the switch 61, and closes the contact 60 to prepare the branch trough 15 for discharge.

The closing of the contact 79 causes the weigher vibrator winding 80 to be actuated to discharge material from the pan 24, and after the first portion thereof has been removed, the switch 70 is opened by movement of the balance arm 30 to prepare the circuit for resetting. The material piles up under the slot 11, and feeds therepast to the slot 12. While the weigh pan 24 is being emptied, the tare switch 45 is closed. This actuates the relay 43 to close the contact 47 to energize the winding 81 of the time delay relay 82, and after a predetermined period of time, the winding 81 opens contact 83 to reset the circuit and drop out the relay 82. The momentary opening of the contact 83 drops out relays 43, 51, 72 and 77.

When the contact 60 is closed, the weigh pan 25 being empty, the switch 90 is closed so that the winding 91 is energized to close the contacts 93 and 94. Closure of the contact 94, the contact 60 being closed, causes energization of the winding 97, which closes contacts 99, 100 and 101. Closure of the contact 101 causes energization of the winding 57 of the ratchet relay 58 to cause a reversal of the contacts 60 and 61 when the winding 57 is deenergized later. Closure of the contact 99 causes periodic energization of the winding 105 associated with the vibrating unit driving the branch trough 15 so that plastic material is fed along the trough 15 from the main trough 8 to the weigh pan 25. As soon as a slight amount of material is dropped into the empty pan 25, the switch 90 is opened to open the contacts 93 and 94. However, the winding 97 remains energized through the holding contact 100 thereof.

While the pan 25 is being filled, the ratchet relay 57 remains energized so that the vibrating unit 26 of the branch trough 14 cannot be operated, the contact 61 being open. However, as soon as the weigh pan 25 receives the weight of material destined therefor, the switch 110 is closed to actuate the relay 112, which closes contacts 113, 114 and 115. Closing of the contact 114 holds the winding 111 energized and closing of the contact 115 causes energization of the relay winding 120 of the relay 121, which opens contacts 108 and 122 and closes the contact 123. Opening of the contact 122 deenergizes the winding 57 of the ratchet relay 58 to cause the contact 61 to close and contact 60 to open. Opening of the contact 108 breaks the circuit to the winding 105 to stop feeding plastic material along the trough 15.

When the contact 61 is reclosed and the material fills up the slot 11 and the material is fed through the slot 12, the vibrating unit 68 of the branch trough 14 is started and begins to fill the pan 24 while the pan 25 is being emptied. As soon as the pan 25 is empty, the switch 90 is closed and the relay winding 92 is energized to close the switch 93. Since the contact 113 is closed at this time, the winding 130 of the relay 131 is energized, which opens contact 132 to reset the portion of the circuit connected to the conductor 133 to zero and the cycle described hereinabove is repeated.

The apparatus described hereinabove may be provided with several more branch troughs in addition to the branch troughs 14 and 15 and have selectively operable vibrating units for the branch troughs so that any desired single one or pair of them may be run, the material feeding past the inactive branch troughs to the branch trough in operation. Furthermore, with such a construction, a control circuit similar to that shown in Fig. 5 may be connected selectively to any desired troughs of the branch troughs and balances associated therewith to run two of the branch troughs alternately and leave the rest of the branch troughs dormant. The apparatus may be provided with slots slanting across the bottom of the trough 8, as contrasted with the transverse disposal of the slots 11 and 12, to spread the material across the troughs, if desired.

The above-described apparatus serves to provide alternate, weighed batches of plastic material to each of the mixers. Thus, by adjusting the balances, as desired, any ratio of delivery to the pigmenting mixers 27 and 28 may be had. The width of the slots 11 and 12 should be sufficient for each slot to handle all the material advanced along the trough 8, and the width of the slot 11 should not be greater than that at which the material is pushed completely across the slot when it is filled with material. This width will be controlled by the width of the trough 8, the rate at which material is fed therealong, the force propelling the material along the trough 8 and the size and weight of the particles of the material.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A conveying apparatus, which comprises a channel having a transverse slot in the bottom portion thereof positioned between the ends thereof, means for advancing material continuously from one end of the channel toward the other end of the channel, a branch conveyor positioned directly below the opening in the channel for receiving material therefrom, means operable for conveying material along the branch conveyor away from the slot, weighing means for receiving material from the branch conveyor, weighing means for receiving material from a portion of the channel spaced on the opposite side of the slot from the end of the channel from which the material is advanced, and means responsive to the weighing means for operating the branch conveyor-operating means intermittently whereby the material entering the channel is divided between the two weighing means.

2. A conveying apparatus, which comprises a main channel disposed generally horizontally and having an opening in the bottom portion intermediate of the ends thereof, said opening extending transversely across said bottom portion, means for advancing material continuously from one end of the channel towards the other end of the channel, a branch channel, means operable for conveying material along the branch channel, said branch channel being positioned directly below the opening in the main channel for receiving material therefrom and arranged so that when the means for conveying material therealong is inoperative the material piles up and bridges the opening to permit material subsequently passing along the main channel to pass thereover, weighing means for receiving material from the branch channel, and means responsive to the weighing means for operating the branch channel conveyor means intermittently, whereby the material entering the main channel is divided into two portions.

3. A conveying apparatus, which comprises a main channel having a plurality of slots extending transversely across the bottom thereof at spaced intervals therealong, vibrating means for advancing material along the main channel, a plurality of branch channels, one branch channel being positioned directly beneath each of the slots in the main channel for receiving material from its associated slot, individual secondary vibrating means associated with each of the branch channels operable to advance material therealong, a plurality of individual weighing devices, one weighing device being positioned at the end of each of the branch channels for receiving material from its associated channel, each of said branch channels being designed so that the material piles up and bridges the slot whenever the associated secondary vibrating means is inoperative, whereby material in the main channel is advanced over said slot, and means actuated by the weighing devices for operating the secondary vibrating means of each of the branch channels alternately to feed material alternately to their respective weighing devices.

4. A conveyor apparatus, which comprises a substantially horizontally disposed main channel having a pair of slots extending transversely across the bottom thereof at spaced intervals therealong, vibrating means for advancing material along the main channel, individual branch channels, one branch channel being positioned directly beneath each of the slots in the main channel for receiving material from its associated slot, individual secondary vibrating means associated with each of the branch channels operable to advance material therealong, individual weighing devices, one weighing device being associated with each of the branch channels for receiving material therefrom, each of said branch channels being designed so that material piles up and bridges its associated slot whenever its associated secondary vibrating means is inoperative, whereby material in the main channel is advanced over said slot, and means actuated by the weighing devices for operating the secondary vibrating means of each of the branch channels alternately to feed material alternately to their respective weighing means, whereby the material advancing along the main channel may be divided into two predetermined portions by weight.

5. A conveyor apparatus, which comprises a substantialy horizontally disposed main channel having a pair of slots extending transversely across the bottom thereof at spaced intervals therealong, vibrating means for advancing material along the main channel, individual branch channels, one branch channel being positioned directly beneath each of the slots in the main channel for receiving material from its associated slot, individual secondary vibrating means associated with each of the branch channels operable to advance material therealong, individual weighing devices, one weighing device being associated with each of the branch channels for receiving material therefrom, each of said branch channels being designed so that the material piles up and bridges its associated slot whenever the associated secondary vibrating means is inoperative, whereby material in the main channel is advanced over said slot, and individual switches associated with each of the weighing devices for controlling the operation of its associated secondary vibrating means, each of said switches being designed to render its associated secondary vibrating means inoperative whenever a predetermined amount of material is received on its associated weighing device and simultaneously initiate the operation of the other secondary vibrating means whereby material is delivered to the other weighing device.

6. A conveyor apparatus, which comprises a substantially horizontally disposed main channel having a pair of slots extending transversely across the bottom thereof at spaced intervals therealong, vibrating means for advancing material along the main channel, individual branch channels, one branch channel being positioned directly beneath each of the slots in the main channel for receiving material from its associated slot, individual secondary vibrating means associated with each of the branch channels operable to advance material therealong, individual weighing devices, one weighing device being associated with each of the branch channels for receiving material therefrom, each of said branch channels being designed so that the material piles up and bridges its associated slot whenever the associated secondary vibrating means is inoperative, whereby material in the main channel is advanced over said slot, individual switches associated with each of the weighing devices for controlling the operation of its associated secondary vibrating means, each of said switches being designed to render its associated secondary vibrating means inoperative whenever a predetermined amount of material is received on its associated weighing device and simultaneously initiate the operation of the other secondary vibrating means whereby material is delivered to the other weighing device, and tertiary vibrating means associated with each of the weighing devices for discharging the predetermined amounts of materials from the weighing devices.

References Cited in the file of this patent

UNITED STATES PATENTS

| Number | Name | Date |
| --- | --- | --- |
| 8,183 | Wright | June 24, 1851 |
| 457,321 | Kinzer | Aug. 4, 1891 |
| 1,322,469 | Ross | Nov. 18, 1919 |
| 1,339,486 | Stuart | May 11, 1920 |
| 2,047,713 | Simpson | July 14, 1933 |
| 2,270,083 | Rapp | Jan. 13, 1942 |
| 2,311,747 | Gooch | Feb. 23, 1943 |
| 2,386,717 | Sample | Oct. 9, 1945 |

FOREIGN PATENTS

| Number | Country | Date |
| --- | --- | --- |
| 13,375 | Great Britain | Feb. 5, 1900 |